United States Patent
Xiong et al.

(10) Patent No.: US 10,627,805 B2
(45) Date of Patent: Apr. 21, 2020

(54) METHOD, DEVICE, AND TERMINAL DEVICE FOR SERVO MOVEMENT SMOOTHING

(71) Applicant: UBTECH Robotics Corp, Shenzhen (CN)

(72) Inventors: Youjun Xiong, Shenzhen (CN); Lifu Zhang, Shenzhen (CN); Dong Liu, Shenzhen (CN); Hanyu Sun, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/140,549

(22) Filed: Sep. 25, 2018

(65) Prior Publication Data
US 2019/0196453 A1    Jun. 27, 2019

(30) Foreign Application Priority Data
Dec. 22, 2017    (CN) .......................... 2017 1 1402868

(51) Int. Cl.
| | | |
|---|---|---|
| G05B 19/25 | (2006.01) | |
| G05B 19/4103 | (2006.01) | |
| G05B 19/408 | (2006.01) | |
| G05B 19/416 | (2006.01) | |

(52) U.S. Cl.
CPC ..... *G05B 19/4103* (2013.01); *G05B 19/4086* (2013.01); *G05B 19/4163* (2013.01); *G05B 2219/42128* (2013.01); *G05B 2219/42173* (2013.01); *G05B 2219/42207* (2013.01); *G05B 2219/43006* (2013.01)

(58) Field of Classification Search
None
See application file for complete search history.

(56) References Cited

U.S. PATENT DOCUMENTS

2008/0125266 A1 *  5/2008  Pohl .......................... D03C 1/00
                                                         475/17

\* cited by examiner

*Primary Examiner* — Karen Masih (57) ABSTRACT

The present disclosure relates to servo control technology, which provides a method, device, and terminal device for servo movement smoothing. The method includes: obtaining a starting position and a control command for a rotation of an output shaft the servo; determining an ending position and a rotation time for the rotation of the output shaft in accordance with the control command; constructing a movement curve of the output shaft based on the starting position, the ending position, and the rotation time; and controlling the output shaft to rotate from the starting position to the ending position in accordance with the movement curve. The above-mentioned method smooths the movement of the servo by constructing a simple linear function, which greatly reduces the calculation amount in comparison with the technical solution using the cubic Bessel formula, and is capable of reducing the requirements for the hardware performance of servos.

15 Claims, 5 Drawing Sheets

```
┌─────────────────────────────────────────────────────────────┐
│ Obtain a starting position and a control command for a      │ ── 101
│ rotation of an output shaft of the servo                    │
└─────────────────────────────────────────────────────────────┘
                              │
                              ▼
┌─────────────────────────────────────────────────────────────┐
│ Determine an ending position and a rotation time for the    │ ── 102
│ rotation of the output shaft of the servo in accordance     │
│ with the control command                                    │
└─────────────────────────────────────────────────────────────┘
                              │
                              ▼
┌─────────────────────────────────────────────────────────────┐
│ Construct a movement curve of the output shaft of the servo │ ── 103
│ based on the starting position, the ending position, and    │
│ the rotation time                                           │
└─────────────────────────────────────────────────────────────┘
                              │
                              ▼
┌─────────────────────────────────────────────────────────────┐
│ Control the output shaft of the servo to rotate from the    │ ── 104
│ starting position to the ending position in accordance      │
│ with the movement curve                                     │
└─────────────────────────────────────────────────────────────┘
```

METHOD, DEVICE, AND TERMINAL DEVICE FOR SERVO MOVEMENT SMOOTHING

CROSS REFERENCE TO RELATED APPLICATIONS

This application claims priority to Chinese Patent Application No. 201711402868.4, filed Dec. 22, 2017, which is hereby incorporated by reference herein as if set forth in its entirety.

BACKGROUND

1. Technical Field

The present disclosure relates to servo control technology, and particularly to a method, device, and terminal device for servo movement smoothing.

2. Description of Related Art

A servo is a position (or angle) actuator, which is suitable for a movement control system that requires the angle to keep changing and can be maintained. At present, servos have been widely used in high-end remote control toys such as airplane models, submarine models, and remote control robots.

The smoothing of the movement of the servo refers to the process of controlling the speed of the servo during the movement starting phase to gradually increase and the speed of the servo during the movement stopping phase to gradually decrease. The smoothing problem is a key issue in the development of servos. The smoothness of the movement of the servo directly affects the overall performance of a control system using the servo.

At present, the cubic Bessel formula is commonly used to smooth the movement of the servo. However, the cubic Bessel formula has an extremely large calculation amount, which has higher requirements for the hardware performance of servos.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

The embodiments of the present disclosure provides a method, device, and terminal device for servo movement smoothing, which is capable of reducing the calculation amount of the smoothing processing for the movement of the servo, and is capable of reducing the requirements for the hardware performance of servos.

Figure 1:
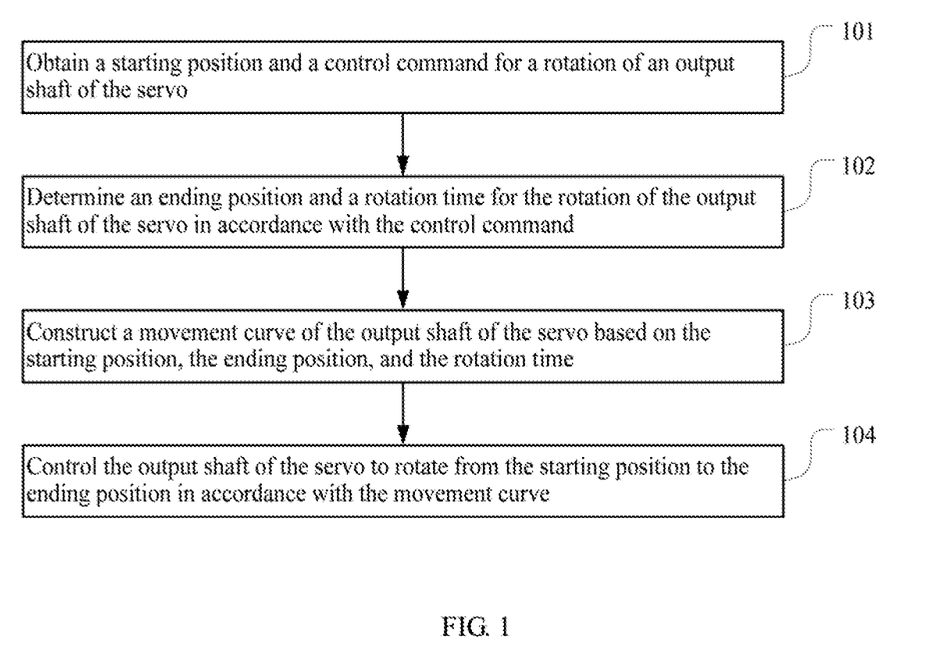
FIG. 1 is a flow chart of a first embodiment of a servo movement smoothing method according to the present disclosure.

FIG. 1 is a flow chart of a first embodiment of a servo movement smoothing method according to the present disclosure. In this embodiment, the method is a computer-implemented method executable for a processor. The servo movement smoothing method of this embodiment can be applied to a servo of a robot, where the robot can be equipped with sensors such as infrared sensors, ultrasound sensors, or laser sensors. The movement of the servo specifically means the movement (i.e., rotation) of the output shaft of the servo. The servo may be used as a joint of the robot, so as to realize the movement of a limb of the robot which connected to the joint. As shown in FIG. 1, the method includes the following steps.

101: obtaining a starting position and a control command for a rotation of an output shaft of the servo.

Before the output shaft the servo begins to rotate, a control system of the robot obtains the starting position and control command of the output shaft t of the servo of the robot. The starting position is the position (or angle) of the output shaft of the servo before the rotation, and the control command includes instruction(s) for controlling the output shaft of the servo to rotate which are transmitted by the control system to the servo, and the instruction(s) include relevant parameters of the rotation of the output shaft of the servo such as rotation time, rotation speed, or rotation angle.

102: determining an ending position and a rotation time for the rotation of the output shaft of the servo in accordance with the control command.

After the control command is obtained, the ending position and the rotation time of the rotation of the output shaft of the servo of the robot are determined according to the control command. The ending position is the position (or angle) of the output shaft of the servo after the rotation, and the rotation time refers to the time spent in the rotation of the output shaft of the servo. Specifically, the control command may include the ending position and rotation time of the rotation of the output shaft of the servo, so that the ending position and the rotation time need only be obtained by parsing from the control command. Alternatively, the control command may include the ending position and a rotation speed of the rotation of the output shaft of the servo, so that the distance of the rotation can be obtained by subtracting the starting position from the ending position, and then the rotation time can be obtained by dividing the distance by the rotation speed. Or alternatively, the control command may include the rotation time and rotation speed of the rotation of the output shaft of the servo, and the distance of the rotation can be obtained by multiplying the rotation time by the rotation speed, and then the ending position can be obtained by subtracting the starting position from the distance.

103: constructing a movement curve of the output shaft of the servo based on the starting position, the ending position, and the rotation time.

After the starting position, the ending position and the rotation time are obtained, the movement curve of the output shaft of the servo of the robot can be constructed based on the ending position and the rotation time. The horizontal coordinate and the vertical coordinate of the movement curve represents the time and the position, respectively (i.e., the horizontal coordinate represents the time while the vertical coordinate represents the position; alternatively, the horizontal coordinate may represent the position while the vertical coordinate may represent the time). In addition, the movement curve includes a linear function of a sine function or a cosine function. Since both of the sine function and the cosine function can form a smooth curve, which are suitable for the smoothing of the rotation of the output shaft of the servo. The movement curve herein is a linear function, which can greatly reduce the amount of computation in comparison with the multi-order Bessel formula. Specifically, the expression of the movement curve may be, for example, $S(t)=Ac+(At-Ac)*\{n*[ta*\sin(bt+\varphi)]\}$, $S(t)=Ac+(At-Ac)*\{n*[ta*\cos(bt+\varphi)]\}$, and the like, where Ac is the starting position, At is the ending position and a, b, $\varphi$, and n are constants.

104: controlling the output shaft of the servo to rotate from the starting position to the ending position in accordance with the movement curve.

After the movement curve of the output shaft of the servo of the robot is constructed, the output shaft of the servo of the robot can be controlled by the control system of the robot to rotate from the starting position to the ending position according to the movement curve. For example, it can control the output shaft of the servo to rotate to each target position (e.g., rotate to a target angle) corresponding to each time point of the movement curve at each time point, thereby realizing the smooth movement.

In this embodiment, the method includes: obtaining a starting position and a control command for a rotation of an output shaft of the servo; determining an ending position and a rotation time for the rotation of the output shaft of the servo in accordance with the control command; constructing a movement curve of the output shaft of the servo based on the starting position, the ending position, and the rotation time, where the horizontal coordinate of the movement curve represents the time, the vertical coordinate of the movement curve represents the position, and the movement curve includes a linear function of a sine function or a cosine function; and controlling the output shaft of the servo to rotate boot the starting position to the ending position in accordance with the movement curve. The above-mentioned method smooths the rotation of the output shaft of the servo by constructing a simple linear function, which greatly reduces the calculation amount in comparison with the technical solution using the cubic Bessel formula, and is capable of reducing the requirements for the hardware performance of servos.

Figure 2:
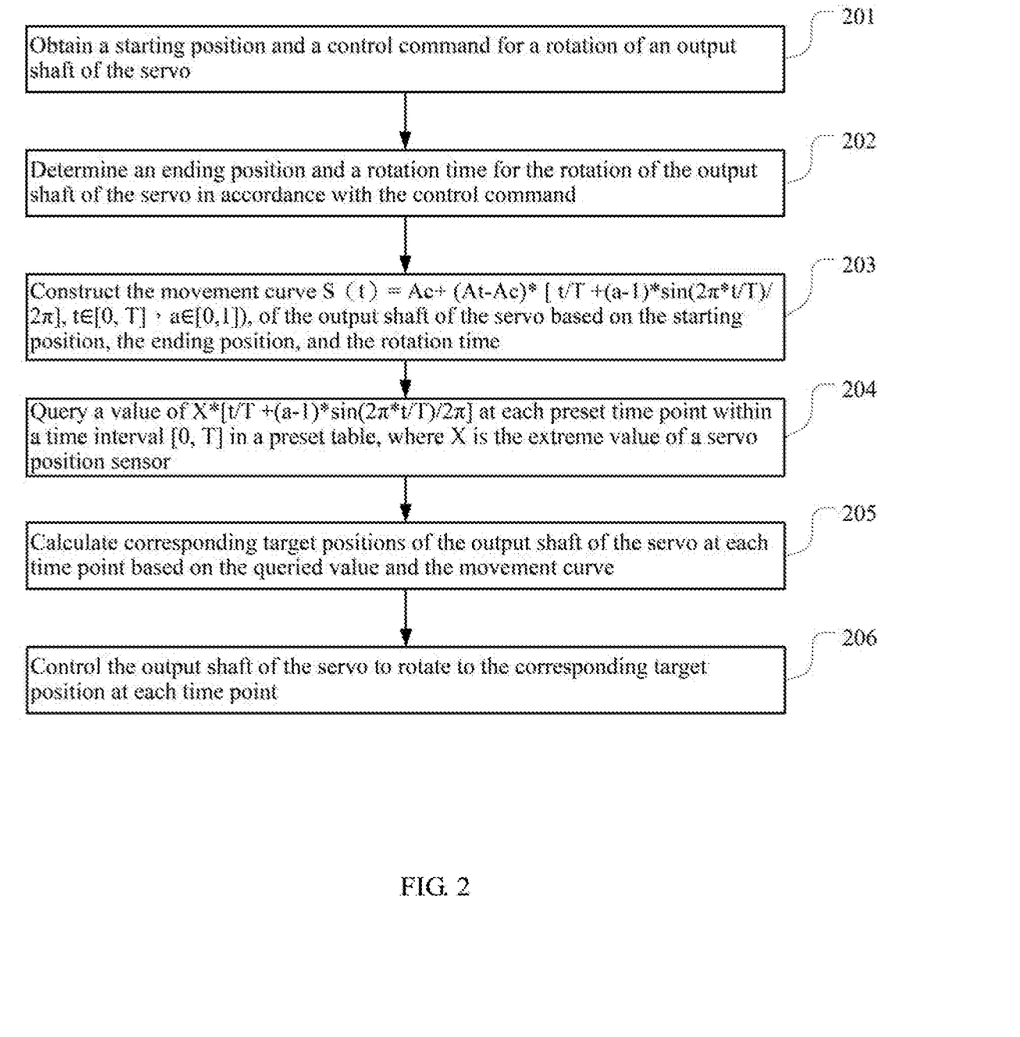
FIG. 2 is a flow chart of a second embodiment of a servo movement smoothing method according to the present disclosure.

FIG. 2 is a flow chart of a second embodiment of a servo movement smoothing method according to the present disclosure. As shown in FIG. 2, the method includes the following steps.

201: obtaining a starting position and a control command for a rotation of an output shaft of the servo.

202: determining an ending position and a rotation time for the rotation of the output shaft of the servo in accordance with the control command.

Steps 201-202 are the same as steps 101-102. For details, refer to the related description of steps 101-102.

203: constructing the movement curve $S(t)=Ac+(At-Ac)*[t/T+(a-1)*\sin(2\pi*t/T)/2\pi]$, $t\in[0, T]$, $a\in[0,1]$), of the output shaft of the servo based on the starting position, the ending position, and the rotation time.

In this embodiment, the specific expression of the movement curve is $S(t)=Ac+(At-Ac)*[t/T+(a-1)*\sin(2\pi*t/T)/2\pi]$, $t\in[0, T]$, $a\in[0,1]$), where t is a time variable, Ac is the starting position, At is the ending position, T is the rotation time (if the control command provides the rotation speed V, then $T=|At-Ac|/V$), and a is a coefficient for adjusting the smoothness of the movement curve. When $t=0$ (i.e., before the output shaft of the servo moves), $S(t)=Ac$, that is, the output shaft of the servo is at the starting position; when $t=T$ (i.e., after the output shaft of the servo is rotated), $S(t)=At$, that is, the output shaft of the servo is a the ending position. Specifically, when $S(t)=Ac+(At-Ac)*t/T$, that is, the movement curve is a straight line with the slope of $(At-Ac)/T$; when $a=0$, $S(t)=Ac+(At-Ac)*[t/T-\sin(2\pi*t/T)/2\pi]$, that is, the movement curve is the curve with the highest level of smoothness; when a is between 0 and 1, $S(t)=Ac+(At-Ac)*[t/T+(a-1)*\sin(2\pi*t/T)/2\pi]$, that is, the movement curve is the curve with the smoothness between the straight line and the curve with the highest level of smoothness. It can be seen that, by adjusting the magnitude of a, different levels of smoothing effects can be realized.

204: querying a value of $X*[t/T+(a-1)*\sin(2\pi*t/T)/2\pi]$ at each preset time point within a time interval [0, T] in a preset table, wherein X is the extreme value of a servo position sensor.

For a servo control system with poor hardware performance, it may not be capable of performing the real-time calculation of sine function values. At this time, the table querying method can be used, that is, the value of the sine function part it the movement curve at each preset time point can be calculated in advance and stored in the preset table, so that the value corresponding to each time point can be obtained by querying the table in the subsequent servo control process so as to reduce the calculation amount and improve the processing speed.

In step 204, the value of $X*[t/T+(a-1)*\sin(2\pi*t/T)/2\pi]$ in each preset time point within the rotation time interval [0, T] of the output shaft of the servo is queried directly from the preset table, where X is the extreme value of the servo position sensor. These values are computed in advance and stored in the table, and each time point corresponds to one value. Since floating point numbers occupy a large amount of storage space, and the calculation amount of floating point calculations is large and takes a long time, it is multiplied by the extreme value X of the servo position sensor when calculating the value of the sine function part so as to convert the floating point numbers into integers for storage, thereby reducing the storage space used and the amount of calculations of subsequent operation steps. Assuming that the rotation time interval of the output shaft of the servo is [0,500] (the time unit is millisecond, hence T=500 ms), the preset time point may be 0 ms, 1 ms, 2 ms, . . . , 500 ms, a part of the time points can be increased or decreased in accordance with the accuracy requirement of the movement control (the more the time points (the more the time points, the greater the precision of control, while the larger the occupied storage spare), and the time interval between different time points be different. tab[t] can be used to represent the value $X*[t/T+(a-1)*\sin(2\pi*t/T)/2\pi]$ which obtained by querying the table, for example, $tab[1]=X*[t/T+(a-1)*\sin(2\pi*t/T)/2\pi]$ represents the value of $X*[t/T+(a-1)*\sin(2\pi*t/T)/2\pi]$ which corresponds to the time point of 1 ms; $tab[2]=X*[t/T+(a-1)*\sin(2\pi*t/T)/2\pi]$ represents the value of $X*[t/T+(a-1)*\sin(2\pi*t/T)/2\pi]$ which corresponds to the time point of 2 ms, and so on.

205: calculating corresponding target positions of the output shaft of the servo at each time point based on the queried value and the movement curve.

After the value of $X*[t/T+(a-1)*\sin(2\pi*t/T)/2\pi]$ corresponding to each time point is obtained by querying, the corresponding target position of the output shaft of the servo at each time point is calculated based on these values and the movement curve. Specifically, the movement curve $S(t)=Ac+(At-Ac)*[t/T+(a-1)*\sin(2\pi*t/T)/2\pi]=Ac+(At-Ac)*tab[t]/X$. After querying the table to, obtain the $tab[t]$ corresponding to each time point, the target position corresponding to each time point can be obtained by calculating $Ac+(At-Ac)*tab[t]/X$. Assuming that X is 4095, the starting position of the rotation of the output shaft of the servo is Ac=2048, the ending position At=0, and the rotation time is T=500 ms. The table contains the values corresponding to 500 time points: {0, 1, 2, 4, ... 4090,4093,4094,4095}, the 500 time points are respectively 1, 2, 3, ..., and 500 which are in milliseconds, that is, $tab[1]=0$, $tab[2]=1$, $tab[3]=2$, ..., $tab[500]=4095$. Therefore, at the time point of 1 ms, the corresponding target position of the output shaft of the servo is $S(1)=Ac+(At-Ac)*tab[1]/X=2048+(0-2048)*0/4095=2048$; at the time point of 2 ms, the corresponding target position of the output shaft of the servo is $S(2)=Ac+(At-Ac)*tab[2]/X=2048+(0-2048)*1/4095=2048-2048/4095$; at the time point of 500 ms, the corresponding target position of the output shaft of the servo is $S(500)=Ac+(At-Ac)\ tab[500]/X=2048+(0-2048)*4095/4095=2048-2048=0$. The target positions of the output shaft of the servo which correspond to other time points can be obtained by calculating through the same method.

Furthermore, if the time point missing the value is found when querying the table, the values corresponding to two time points adjacent to the time point missing the value is selected to perform a linear interpolation operation, and the result of the linear interpolation operation is taken as the value corresponding to the time point missing the value, in which the time point missing the value indicates the preset time point failed to query out the value from the table.

Specifically, if the value of tab[x] which is corresponded by a certain time point x is not queried out from the table, the value corresponding to the two time points adjacent to the time point x may be selected to perform the linear interpolation operation. The two adjacent time points are the time point before and closest to the time point x as well as the time point after and closest to the time point x, respectively, which have the values can be obtained by querying the table. Assuming that the time point x is a time point between the time points of 3 ms and 5 ms, the values corresponded by 3 ms and 5 ms, that is, tab[3] and tab[5], are selected to perform the linear interpolation operation, and the result of the linear interpolation operation is taken as the value corresponding to the time point x. It can be seen that, by setting in this way, for the time point in the table which missing the value, an approximate value close to the actual value can be obtained to perform a substitution calculation, which improves the success rate of the algorithm.

206: controlling the output shaft of the servo to rotate to the corresponding target position at each time point.

After the corresponding target position of the output shaft of the servo at each time point is obtained by calculating, the output shaft of the servo can be controlled to reach the corresponding target position at each time point, thereby realizing the smoothing of the rotation of the output shaft of the servo.

In this embodiment, the method includes: obtaining a starting position and a control command for a rotation of an output shaft of the servo; determining an ending position and a rotation time for the rotation of the output shaft of the servo in accordance with the control command; constructing a movement curve of the output shaft of the servo based on the starting position, the ending position, and the rotation time, where the movement curve $S(t)=Ac+(At-Ac)*[t/T+(a-1)*\sin(2\pi*t/T)/2\pi]$, $t\in[0, T]$, $a\in[0,1]$; querying a value of $X*[t/T+(a-1)*\sin(2\pi*t/T)/2\pi]$ at each preset time point within a time interval [0, T] in a preset table, where X is the extreme value of a servo position sensor; calculating corresponding target positions of the servo at each time point based on the queried value and the movement curve; and controlling the output shaft of the servo to rotate to the corresponding target position at each time point. In comparison with the first embodiment of the present application, this embodiment uses the table querying method to obtain the values corresponding to each of the preset time points in the movement curve, which can further reduce the calculation amount and improve the software processing speed, especially suitable for the servo control means of poor hardware performance.

Figure 3:
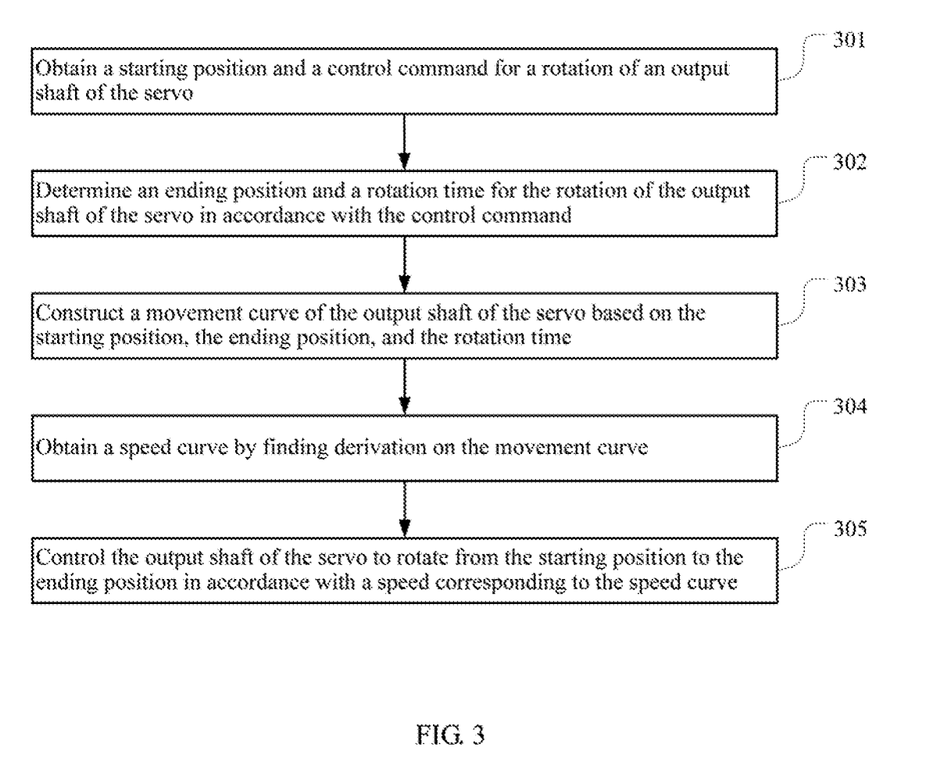
FIG. 3 is a flow chart of a third embodiment of a servo movement smoothing method according to the present disclosure.

FIG. 3 is a flow chart of a third embodiment of a servo movement smoothing method according to the present disclosure. As shown in FIG. 3, the method includes the following steps.

301: obtaining a starting position and a control command for a rotation of an output shaft of the servo.

302: determining an ending position and a rotation time for the rotation of the output shaft of the servo in accordance with the control command.

303: constructing a movement curve of the output shaft of the servo based on the starting position, the ending position, and the rotation time.

Steps 301-303 are the same as steps 101-103. For details, refer to the related description of steps 101-103.

304: obtaining a speed curve by finding derivation on the movement curve.

After the movement curve of the output shaft of the servo is obtained, the movement curve is found derivation to obtain a speed curve. The speed curve defines the speed corresponding to each time point when the output shaft of the servo is rotated from the starting position to the ending position. Assuming that the movement curve is $S(t)=t-\sin(t)$, $t\in[0,2\pi]$, the velocity curve V(t) is the derivative of S(t) with regard to time t, that is, $V(t)=1-\cos(t)$, $t\in[0, 2\pi]$. Before the output shaft of the servo starts rotating, that is, when t=0, V(t)=0; when the output shaft of the servo stops rotating, that is, when $t=2\pi$, V(t)=0, and when $t\in(0, At\ 2\pi)$, V(t) gradually increases to the maximum value, and then gradually decreases from the maximum value, thereby realizing the smoothing of the rotation of the output shaft of the servo.

305: controlling the output shaft of the servo to rotate from the starting position to the ending position in accordance with a speed corresponding to the speed curve.

After the speed curve is obtained, the output shaft of the servo is controlled to rotate from the starting position to the ending position according to the speed corresponding to the speed curve, so that a smooth movement effect can be achieved. In the specific operation process, the speed of the output shaft of the servo at each time point is obtained by calculating according to the speed curve and then the output shaft of the servo is controlled to rotate in the corresponding speed at each of the time points.

In this embodiment, the method includes: obtaining a starting position and a control command for a rotation of an output shaft of the servo; determining an ending position and a rotation time for the rotation of the output shaft of the servo in accordance with the control command; constructing a movement curve of the output shaft of the servo based on the starting position, the ending position, and the rotation time, where the horizontal coordinate of the movement curve represents the time, the vertical coordinate of the movement curve represents the position, and the movement curve includes a linear function of a sine function or a cosine function; getting derivation of the movement curve to obtain a speed curve; and controlling the output shaft of the servo to rotate from the starting position to the ending position in accordance with a speed corresponding to the speed curve. The above-mentioned method smooths the rotation of the output shaft of the servo by constructing a simple linear function, which greatly reduces the calculation amount in comparison with the technical solution using the cubic Bessel formula, and is capable of reducing the requirements for the hardware performance of servos.

It should be understood that, the order of the serial number of each step in the above-mentioned embodiments does not mean the order of execution, and the order of execution of each process should be determined by its function and internal logic, and should not constitute any limitation on the implementation process of the embodiments of the present disclosure.

The forgoing mainly describes a smoothing method for the rotation of the output shaft of the servo of the robot, and a servo movement smoothing device will be described below.

Figure 4:
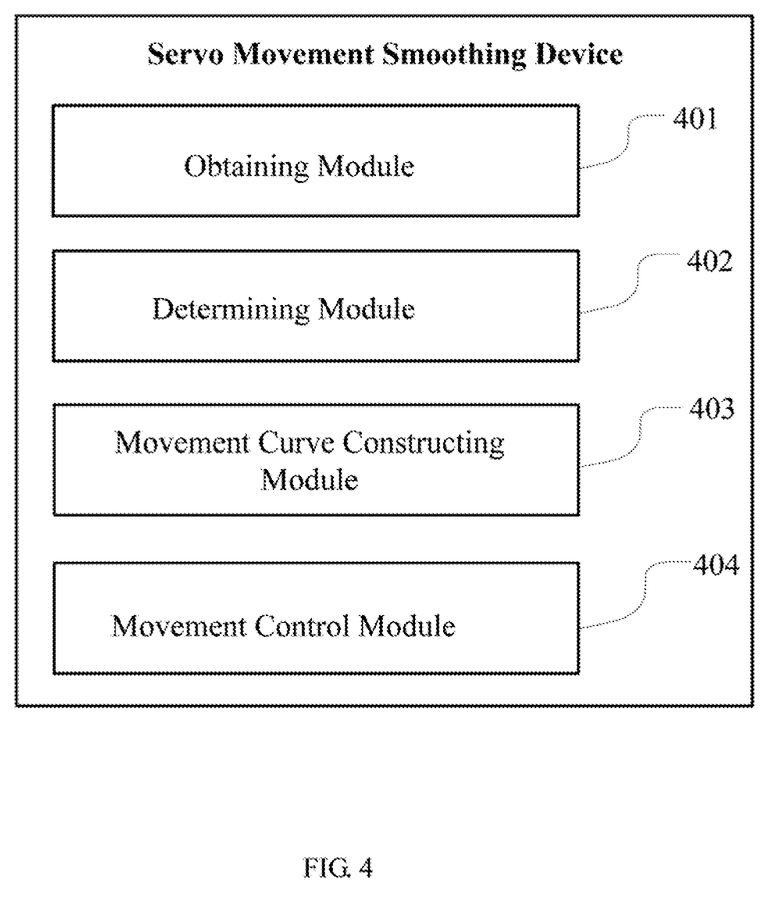
FIG. 4 is a schematic block diagram of a servo movement smoothing device according to an embodiment of the present disclosure.

FIG. 4 is a schematic block diagram of a servo movement smoothing device according to an embodiment of the present disclosure. The servo movement smoothing device of this embodiment can be used to control a servo of a robot. As shown its FIG. 4, a servo movement smoothing device includes:

an obtaining nodule 401 configured to obtain a starting position and a control command for a rotation of an output shaft of the servo;

a determining module 402 configured to determine an ending position and a rotation time for the rotation of the output shaft of the servo in accordance with the control command;

a movement curve constructing module 403 configured to construct a movement curve of the output shaft of the servo based on the starting position, the ending position, and the rotation time, wherein the horizontal coordinate of the movement curve is time, the vertical coordinate of the movement curve is position, and the movement curve includes a linear function of a sine function or a cosine function; and a movement control module 404 configured to control the output shaft of the servo to rotate from the starting position to the ending position in accordance with the movement curve.

Furthermore, the expression of the movement curve may be: $S(t)=Ac+(At-Ac)*[t/T+(a-1)*\sin(2\pi*t/T)/2\pi]$, $t\in[0, T]$, $a\in[0, 1]$, where t is a time variable, Ac is the starting position, At is the ending position, T is the rotation time, and a is the smoothing used to the movement curve Furthermore, the movement control module 404 may include:

a value querying unit configured to query a value of $X*[t/T+(a-1)*\sin(2\pi*t/T)/2\pi]$ at each preset time point within a time interval [0, T] in a preset table, wherein X is the extreme value of a servo position sensor;

a position calculating unit configured to calculate corresponding target positions of the output shaft of the servo at each time point based on the queried value and the movement curve; and a movement controlling unit configured to control the output shaft of the servo to rotate to the corresponding target position at each time point.

Furthermore, the servo movement smoothing device may further include other modules/units configured to implement the steps of any of the servo movement smoothing method shown in FIG. 1-FIG. 3.

The present disclosure further provides a terminal device including a memory, a processor, and a computer program stored in the memory and executable on the processor, in which the processor implements the steps of any of the servo movement smoothing method shown in FIG. 1-FIG. 3 when executing the computer program.

The present disclosure further provides a computer readable storage medium, in which the computer readable storage medium stores a computer program, and the computer program implements any of the servo movement smoothing method shown in FIG. 1-FIG. 3 when executed by the processor.

Figure 5:
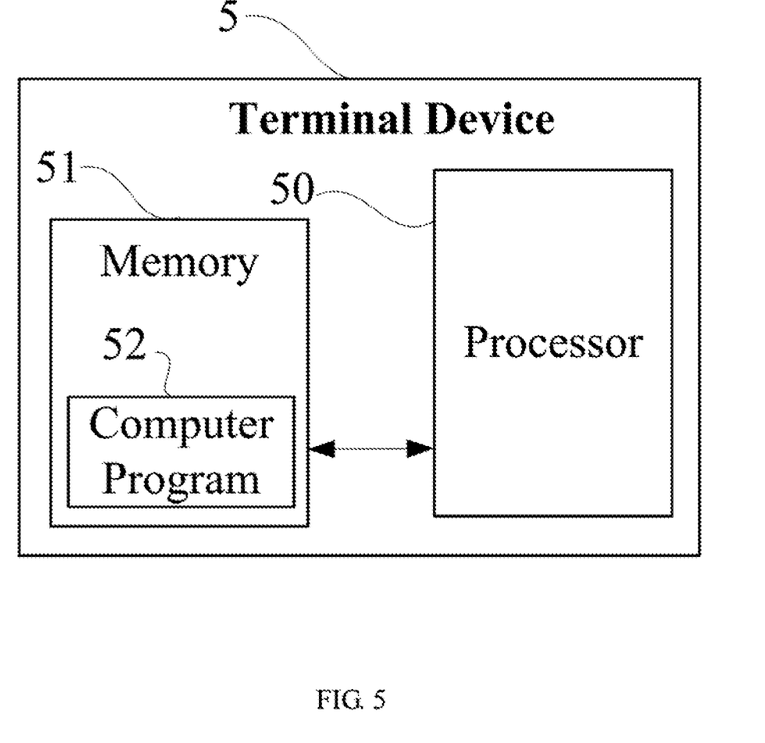
FIG. 5 is a schematic block diagram of a terminal device according to an embodiment of the present disclosure.

FIG. 5 is a schematic diagram of a terminal device according to an embodiment of the present disclosure. The terminal device of this embodiment can be used to control a servo of a robot. As shown in FIG. 5, the terminal device 5 of this embodiment includes a processor 50, a memory 51, and a computer program 52 stored in the memory 51 and executable on the processor 50. When executing (instructions in) the computer program 52, the processor 50 implements the steps in the above-mentioned embodiments of the servo smoothing method, for example, steps 101-104 shown in FIG. 1. Alternatively, when the processor 50 executes (instructions in) the computer program 52, the functions of each module/unit in the above-mentioned device embodiments, for example, the functions of the modules 401-404 shown in FIG. 4 are implemented.

The computer program 52 may be divided into one or more modules/units, and the one or more, modules/units are, stored in the storage 51 and executed by the processor 50 to realize the present disclosure. The one or more modules/units may be a series of computer program instruction sections capable of performing a specific function, and the in sections are for describing the execution process of the computer program 52 in the terminal device 5.

The terminal device 5 may be any of a computing device such as a desktop computer, a notebook computer, a tablet computer, and a cloud server. The terminal device 5 may include, but is not limited to, a processor 50 and a storage 51. It can be understood by those skilled in the art that FIG. 5 is merely an example of the terminal device 5 and does not constitute a limitation on the terminal device 5, and may include more or fewer components than those shown in the figure, or a combination of some components or different components. For example, the terminal device may further include an input output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the terminal device 5, for example, a hard disk or a memory of the terminal device 5. The storage 51 may also be an external storage device of the terminal device 5, for example, a plug-in hard disk, a smart media card (SMC), a secure digital (SD) card, flash card, and the like, which is equipped on the terminal device 5. Furthermore, the storage 51 may further include both an internal storage unit and an external storage device, of the terminal device 5. The storage 51 is configured to store the computer program and other programs and data required by the terminal device 5. The storage 51 may also be used to temporarily store data that has been or will be output.

Those skilled in the art may clearly understand that, for the convenience and simplicity of description, the division of the above-mentioned functional units and modules is merely am example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure.

Those who skilled in the art can clearly understand that, for the convenience and brevity of the description, the specific operation process of the above-mentioned device and unit can refer to the corresponding process in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus and method may be implemented in other manners. For example, the above-mentioned embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unite may be implemented in the form of hardware or in the form of software functional unit.

When the integrated unit is implemented in the form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals, and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within, the scope of the present disclosure.

What is claimed is:

1. A computer-implemented servo movement smoothing method for a servo of a robot, comprising executing on a processor steps of:

obtaining a starting position and a control command for a rotation of an output shaft of the servo;

determining an ending position and a rotation time for the rotation of the output shaft of the servo in accordance with the control command;

constructing a movement curve of the output shaft of the servo based on the starting position, the ending position, and the rotation time, wherein a horizontal coordinate of the movement curve represents time, a vertical coordinate of the movement curve represents a position, and the movement curve includes a linear function of a sine function or a cosine function; and controlling the output shaft of the servo to rotate from the starting position to the ending position in accordance with the movement curve.

2. The method of claim 1, wherein an expression of the movement curve is: $S(t)=Ac+(At-Ac)*[t/T+(a-1)*\sin(2\pi*t/T)/2\pi]$, $t\in[0, T]$, $a\in[0,1]$, where t is a time variable, Ac is the starting position, and At is the ending position, T is the rotation time, and a is a coefficient for adjusting the smoothness of the movement curve.

3. The method of claim 2, wherein the step of controlling the output shaft of the servo to rotate from the starting position to the ending position in accordance with the movement curve comprises:

querying a value of $X*[t/T+(a-1)*\sin(2\pi*t/T)/2\pi]$ at each preset time point within a time interval [0, T] in a preset table, wherein X is an extreme value of a servo position sensor;

calculating corresponding target positions of the output shaft of the servo at each time point based on the queried value and the movement curve; and controlling the output shaft of the servo to rotate to the corresponding target position at each time point.

4. The method of claim 3, further comprising:

selecting values corresponding to two time points adjacent to the time point missing the value to perform a linear interpolation operation, and taking the result of the linear interpolation operation as the value corresponding to the time point missing the value, in response to the time point missing the value being found when querying the table, wherein the time point missing the value is the preset time points failed to query out the value from the table.

5. The method of claim 1, wherein the step of controlling the output shaft of the servo to rotate from the starting position to the ending position in accordance with the movement curve comprises:

obtaining a speed curve by finding derivation on the movement curve; and controlling the output shaft of the servo to rotate from the starting position to the ending position in accordance with a speed corresponding to the speed curve.

6. A servo movement smoothing device for a servo of a robot, comprising:

an obtaining module configured to obtain a starting position and a control command for a rotation of an output shaft of the servo;

a determining module configured to determine an ending position and a rotation time for the rotation of the output shaft of the servo in accordance with the control command;

a movement curve constructing module configured to construct a movement curve of the output shaft of the servo based on the starting position, the ending position, and the rotation time, wherein a horizontal coordinate of the movement curve represents time, a vertical coordinate of the movement curve represents a position, and the movement curve includes a linear function of a sine function or a cosine function; and a movement control module configured to control the output shaft of the servo to rotate from the starting position to the ending position in accordance with the movement curve.

7. The device of claim 6, wherein an expression of the movement curve is: $S(t)=Ac+(At-Ac)*[t/T+(a-1)*\sin(2\pi*t/T)/2\pi]$, $t\in[0, T]$, $a\in[0,1]$, where t is a time variable, Ac is the starting position, and At is the ending position, T is the rotation time, and a is a coefficient for adjusting the smoothness of the movement curve.

8. The device of claim 7, wherein the movement control module comprises:

a value querying unit configured to, query a value of $X*[t/T+(a-1)*\sin(2\pi*t/T)/2\pi]$ at each preset time point within a time interval [0, T] in a preset table, wherein X is an extreme value of a servo position sensor;

a position calculating unit configured to calculate corresponding target positions of the output shaft of the servo at each time point based on the queried value and the movement curve; and a movement controlling unit configured to control the output shaft of the servo to rotate to the corresponding target position at each time point.

9. The device of claim 8, further comprising:

another module configured to select values corresponding to two time points adjacent to the time point missing the value to perform a linear interpolation operation, and take the result of the linear interpolation operation as the value corresponding to the time point missing the value, in response to the time point missing die value being found when querying the table, wherein the time point missing the value is the preset time points failed to query out the value from the table.

10. The device of claim 6, wherein the movement control module is configured to:

obtain a speed curve by finding derivation on the movement curve; and control the output shaft of the servo to rotate from the starting position to the ending position in accordance with a speed corresponding to the speed curve.

11. A terminal device for a servo of a robot, comprising a non-transitory memory, one or more processors, and one or more computer programs, wherein the one or more computer programs are stored in the non-transitory memory and configured to be executed by the one or more processors, the one or more programs comprise:

instructions for obtaining a starting position and a control command for a rotation of an output shaft of the servo;

instructions for determining an ending position and a rotation time for the rotation of the output shaft of the servo in accordance with the control command;

instructions for constructing a movement curve of the output shaft of the servo based on the starting position, the ending position, and the rotation time, wherein a horizontal coordinate of the movement curve represents time, a vertical coordinate of the movement curve represents a position, and the movement curve includes a linear function of a sine function or a cosine function; and instructions for controlling the output shaft of the servo to rotate from the starting position to the ending position in accordance with the movement curve.

12. The terminal device of claim 11, wherein an expression of the movement curve is: $S(t)=Ac+(At-Ac)*[t/T+(a-1)*\sin(2\pi*t/T)/2\pi]$, $t\in[0, T]$, $a\in[0,1]$, where t is a time variable, Ac is the starting position, and At is the ending position, T is the rotation time, and a is a coefficient for adjusting the smoothness of the movement curve.

13. The terminal device of claim 12, wherein the instructions for controlling the output shaft of the servo to rotate from the starting position to the ending position in accordance with the movement curve comprise:
   instructions for querying a value of $X*[t/T+(a-1)*\sin(2\pi*t/T)/2\pi]$ at each preset time point within a time interval [0, T] in a preset table, wherein X is an extreme value of a servo position sensor;
   instructions for calculating corresponding target positions of the output shaft of the servo at each time point based on the queried value and the movement curve; and
   instructions for controlling the output shaft of the servo to rotate to the corresponding target position at each time point.

14. The terminal device of claim 13, wherein the one or more programs further comprise:
   instructions for selecting values corresponding to two time points adjacent to the time point missing the value to perform a linear interpolation operation, and taking the result of the linear interpolation operation as the value corresponding to the time point missing the value, in response to the time point missing the value being found when querying the table, wherein the time point missing the value is the preset time points failed to query out the value from the table.

15. The terminal device of claim 11, wherein the instructions for controlling the output shaft of the servo to rotate from the starting position to the ending position, in accordance with the movement curve comprise:
   instructions for obtaining a speed curve by finding derivation on the movement curve; and
   instructions for controlling the output shaft of the servo to rotate from the starting position to the ending position in accordance with a speed corresponding to the speed curve.

* * * * *